March 2, 1948.  A. L. WILSON  2,436,984
ELECTRICAL CABLE
Filed March 13, 1944
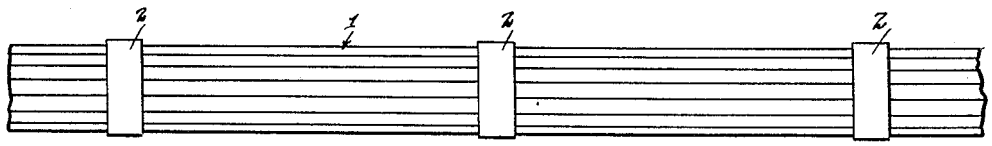
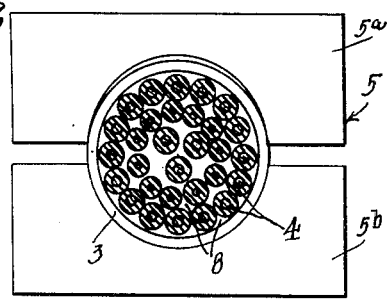 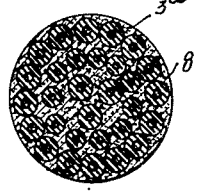
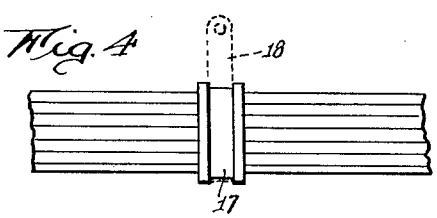 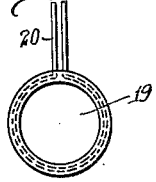 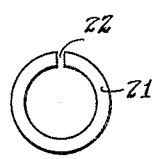
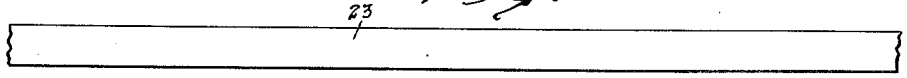
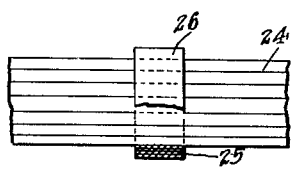 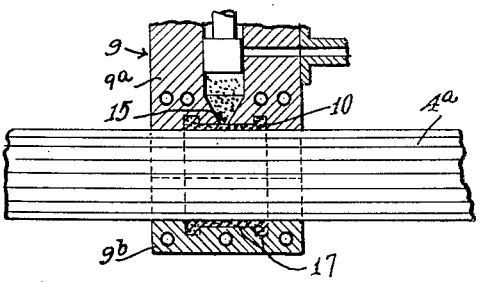
Inventor
Arthur L. Wilson
By Lyon & Lyon
Attorneys Patented Mar. 2, 1948

2,436,984

UNITED STATES PATENT OFFICE 2,436,984

ELECTRICAL CABLE

Arthur L. Wilson, Brentwood, Calif.

Application March 13, 1944, Serial No. 526,201

2 Claims. (Cl. 174—40)

This invention relates to improvements in wiring forms or cable harnesses. In forming cables, composed of substantially parallel strands, according to the present practice, it is necessary to "stitch" the strands together, at intervals along the length of the cable. This is usually accomplished by applying spaced ties of cord, or friction tape, along the length of the cable.

One of the objects of this invention is to maintain said wiring forms or harnesses in a form commonly known as a cable.

Another object of this invention is to maintain the individual wires forming a cable in close juxtaposition or in spaced relationship with each other, as may be most desirable.

The strands or wires forming these cables are usually covered with electrical insulation and one of the objects of the invention is to provide a simple method and means of binding the strands together to operate in such a way as to cause no injury to said insulation.

One method by which this may be accomplished is by the use of molded plastic bands, molded in position around the cable or harnesses at spaced intervals. These molded plastic bands will not cut into the insulation of the individual wires making up the cable, and being molded in position will hold the individual wires and bind them into one solid mass. These bands may be wide or narrow as dictated by the individual needs of each cable or parts of a cable.

There are many and various ways of forming these plastic bands. The bands may be formed of any thermo-plastic or thermo-setting plastic, and is not limited to the use of insulating plastic material as in some instances metal might be more desirable, and any metal, with a plastic flow which would not injure the insulating covering of the wires forming the cable, could be used.

Another object of the invention is to provide a ready means of mounting the completed cable or harness in its operating position. One way in which this may be accomplished is by molding grooves on the outside of the plastic bands in which wire or other loops or clips may encircle the cable at this point. The clips, loops or other devices, which may be of metal, fiber or other suitable material, could be molded in place in the bands, or inserts could be molded in the band in order to facilitate a screw, or other type of fastening device, for the purpose of mounting the completed cable or harness.

There are many and various ways of forming these plastic bands. One method of forming them is by placing the cable in a simple mold, and the plastic molded around the wires forming the cable, by the injection molding process.

Another method of forming these bands, is by threading the individual wires of the cable through short lengths of pre-formed plastic tubing. These individual lengths of tubing would be placed at spaced intervals along the cable. These tubes may then be closed around the cable and molded in this position by a simple hand-operated mold, with the necessary combination of heat and pressure to perform the operation. Of course, it is understood that the mold may be operated by any means, other than by hand, as is apparent to anyone versed in the art.

Another method by which these bands may be formed, is by the use of short lengths of pre-formed plastic tubing mentioned in the last paragraph, but the tubes in this case could be split. They could lap or not, as found most expedient. This would enable the bands to be placed around the cable, and molded in this position, without threading the individual wires through the tube. These bands would be closed around the cable and molded in this position in a similar manner to the solid tubes.

Another method by which these bands may be formed is by the use of a thin, narrow ribbon of plastic material which may be wrapped around the wires forming the cable, forming bands in spaced relationship to each other in much the same manner friction tape would be used. These bands would then be closed around the cable and molded in this position by the same means as previously mentioned. The use of these plastic bands is not limited to electric cable, but could be used in holding metal or other tubing in a form such as is used in airplane hydraulic installations. In using it in this way, the individual tubes could be held in spaced relation to each other, thereby preventing metal to metal contact of the individual tubes, which is the greatest source of danger in any use of tubing.

In the drawings:

Figure 1 is a side elevation of a cable formed of strands bound together by plastic bands.

Figure 2 is a vertical section through a mold. In this view the cable is illustrated in cross section lying within the mold.

Figure 3 is a transverse section through a cable embodying my invention, and illustrating the manner in which the strands of the cable are bound together in cable form.

Figure 4 is a side elevation showing a short length of cable in which the binding element is in the form of a collar, adapting the same to the application of hangers for supporting the cable at different points along its length.

Figure 5 is an end view of a band of plastic material with the hanger means molded into the same, and which may be used to bind the strands of wire into a cable with the hanger in position ready to be used to support the cable at different points along its length.

Figure 6 is a view illustrating a split sleeve or collar of plastic material which may be opened and sprung over the individual wires forming the cable.

Figure 7 is a view showing a portion of a tape or band of plastic material which may be employed in the manner illustrated in Figure 8 for binding the cable strands together.

Figure 8 is a side elevation of a short length of cable, the strands of which are united by means of the tape or band illustrated in Figure 7. In Figure 8 a portion of the binding is cut away to show the binding element in cross section.

Figure 9 is a longitudinal section through a mold showing a short length of cable strands held in the same and illustrating a method by which the bands may be formed by the injection molding process.

Figure 1 illustrates a short length of cable 1 with a plurality of spaced binding elements 2. These elements or bands may be applied in various ways. As illustrated in Figure 2, a short length of sleeve 3 of plastic material may be slipped into place over the strands 4 of the cable and this sleeve may then be placed within a sectional mold 5 composed of two or more sections 5a and 5b. The sections of this mold are provided with means for contracting the mold around the outside circumference of the plastic sleeve. If a thermo-plastic material is used, heat would also be applied, as well as pressure, so as to cause the thermo-plastic material to flow into intimate contact with the wires forming the cable.

After the plastic bands are molded by the method illustrated in Figure 2, the cross section of the cable at the location of the band 3, would have the general appearance illustrated in Figure 3. The molded band 3a would be of smaller diameter than the sleeve 3 illustrated in Figure 2, due to the fact that some of the material of the sleeve will have been forced into all or some of the spaces 8 between the cable strands. The material of the band will conform to the exterior of the insulation wires of the cable 1 which are adjacent the band. In many cases the material of the band will adhere or be molded to such insulation. In all other cases the material of the band conforms so closely to the exterior of the insulation or wires adjacent to the band as to make such wires and band into a solid, rigid unit.

In Figure 9 is illustrated one way in which the injection molding method of molding these bands may be used. Cable strands 4a are placed in a mold 9 composed of sections such as the sections 9a and 9b that come together to form a mold cavity 10. One of these sections is provided with a connection for admitting a plastic under pressure from a source, where it would be subjected to such pressure and heat. This plastic would be injected through a small opening 15, into the mold cavity 10. This mold cavity 10 is shown with the ends of the cavity enlarged, so that the completed band would have substantially the appearance illustrated in Figure 4.

Figure 4 shows the form of band as produced in the mold cavity 10 shown in Figure 9, and shows the band to be in collar form with a circumferential groove 17, which adapts the collar for being supported on a hanger 18 illustrated in dotted lines. The hanger shown would form a loop passing around the groove 17.

If desired, a hanger such as a hanger 18 in Figure 4, may be molded in the plastic band forming the collar, as illustrated in Figure 5, in which the hanger 20 is shown as completely encircling the cable 19.

In Figures 7 and 8 is shown another method of forming these bands, in which a continuous tape 23 of relatively thin plastic material is used. This tape would be wrapped around a cable 24, as illustrated in Figure 8, so that a number of layers 25 would be formed, thereby producing a band 26. This band would then be placed in a mold such as shown in Figure 2 and heat and pressure applied to mold the tape into a compact mass, forming substantially a collar surrounding the cable.

In Figure 6 is shown another method of forming the band, in which a ring 21 having a split as indicated at 22 is employed. The split 22 enables the wires to be assembled inside of the ring by passing through the split 22, after which the split ring may be assembled between the molds as shown in Figure 2, and the split of the ring will be closed by the molding process.

Many other methods of forming bands may be resorted to without departing from the spirit of the invention.

What I claim is:

1. A binding means for holding a bundle of wires in cable form, comprising: a plurality of bands of plastic material wrapped around said bundle of wires at spaced intervals and subjected to pressure to form an intimate bond therewith, and hanger elements extending from at least some of the bands to facilitate mounting said cable, said bands forming an insulation means isolating said elements from said wires.

2. In a cable harness, a bundle of loose wires, spaced plastic bands molded in position around the wires to hold the wires in cable form, and having means projecting from said bands to subsequently hold the cable in position.

ARTHUR L. WILSON.

REFERENCES CITED

The following references are of record in the file of this patent:

UNITED STATES PATENTS

| Number | Name | Date |
| --- | --- | --- |
| 395,207 | Bowen | Dec. 25, 1888 |
| 428,745 | Candee | May 27, 1890 |
| 586,771 | Kempshall | July 20, 1897 |
| 657,375 | Williams | Sept. 4, 1900 |
| 965,207 | Mast | July 26, 1910 |
| 1,267,832 | Wilkinson | May 28, 1918 |
| 1,512,162 | Dennis | Oct. 21, 1924 |
| 1,656,258 | Yale | Jan. 17, 1928 |
| 1,904,887 | Shee | Apr. 18, 1933 |
| 2,066,525 | Gilbert | Jan. 5, 1937 |
| 2,136,230 | Berman | Nov. 8, 1938 |
| 2,139,888 | Fausek | Dec. 13, 1938 |
| 2,223,017 | Abrams et al. | Nov. 26, 1940 |
| 2,299,140 | Hanson | Oct. 20, 1942 |

FOREIGN PATENTS

| Number | Country | Date |
| --- | --- | --- |
| 786,728 | France | June 17, 1935 |